US012728852B2

(12) United States Patent
Akimoto

(10) Patent No.: US 12,728,852 B2
(45) Date of Patent: Sep. 8, 2026

(54) VEHICLE CONTROL DEVICE AND STORAGE MEDIUM

(71) Applicant: TOYOTA JIDOSHA KABUSHIKI KAISHA, Toyota (JP)

(72) Inventor: Hikaru Akimoto, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/963,198

(22) Filed: Nov. 27, 2024

(65) Prior Publication Data

US 2025/0256712 A1 Aug. 14, 2025

(30) Foreign Application Priority Data

Feb. 9, 2024 (JP) ................................ 2024-018695

(51) Int. Cl.
*B60W 30/14* (2006.01)

(52) U.S. Cl.
CPC ..... *B60W 30/143* (2013.01); *B60W 2554/406* (2020.02); *B60W 2720/106* (2013.01)

(58) Field of Classification Search
CPC ......... B60W 30/143; B60W 2554/406; B60W 2720/106; B60W 30/16
See application file for complete search history.

(56) References Cited

U.S. PATENT DOCUMENTS 6,580,996 B1 * 6/2003 Friedrich ............. B60W 30/16 701/36
8,355,851 B2 1/2013 Inoue et al.
8,370,040 B2 2/2013 Inoue et al.
8,417,430 B2 4/2013 Saeki
8,548,709 B2 10/2013 Morita
8,768,597 B2 7/2014 Kagawa
9,174,643 B2 11/2015 Aso
10,017,178 B2 7/2018 Morimoto et al.
10,118,617 B2 11/2018 Urano et al.
10,486,698 B2 11/2019 Masui et al.
12,205,464 B2 * 1/2025 Pedersen .......... G08G 1/096775
2012/0083987 A1 * 4/2012 Schwindt .............. B60W 30/16 701/96
2017/0327116 A1 * 11/2017 Heo ................ B60W 30/18018
2019/0295419 A1 9/2019 Tosa et al.
2020/0001871 A1 * 1/2020 Wang .................... B60W 30/16
2020/0307581 A1 * 10/2020 Shimbo ................. B60W 30/09
2022/0219691 A1 * 7/2022 Maleki ................ G06F 11/0754
2023/0067494 A1 * 3/2023 Westover ............ B60W 30/143
(Continued)

FOREIGN PATENT DOCUMENTS

JP 2005-075303 A 3/2005
JP 2011-048456 A 3/2011

*Primary Examiner* — Donald J Wallace
*Assistant Examiner* — Jalal C Coduroglu
(74) *Attorney, Agent, or Firm* — SoraIP, Inc.

(57) ABSTRACT

A control unit is provided for executing cruise control for causing a vehicle to travel while maintaining a set speed, and the control unit is a vehicle control device that determines whether or not there is a traffic factor affecting the cruise control on the basis of a detection value for detecting the surroundings of the vehicle in the cruise control for maintaining the set speed, and adjusts first acceleration set in the cruise control according to the content of the traffic factor when the traffic factor is present.

8 Claims, 4 Drawing Sheets

(56) References Cited

U.S. PATENT DOCUMENTS

| | | | | |
|---|---|---|---|---|
| 2023/0234587 | A1* | 7/2023 | Ito | B60W 30/16 701/96 |
| 2023/0399013 | A1* | 12/2023 | Kume | B60W 30/162 |
| 2025/0145157 | A1* | 5/2025 | Dobkowitz | B60W 30/16 |

* cited by examiner

FIG. 3
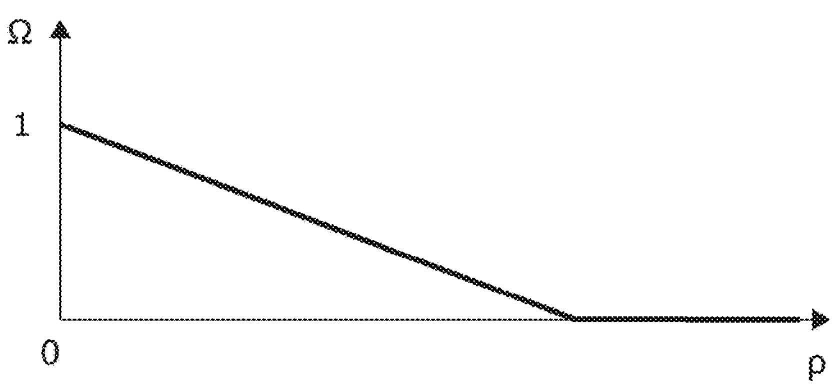
FIG. 4
| ROAD ATTRIBUTES | HIGH STANDARD ROAD | COUNTRY ROAD | SEMI-URBAN AREA | RESIDENTIAL AREA |
| --- | --- | --- | --- | --- |
| Ω | 1 | 0.8 | 0.6 | 0.5 |
FIG. 5
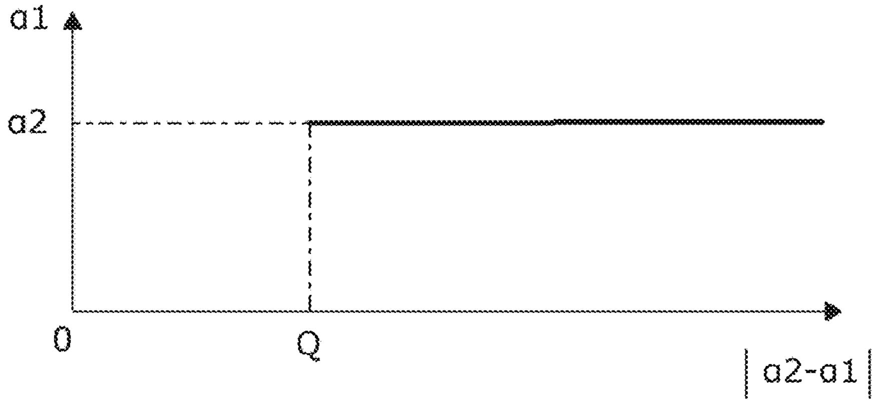

VEHICLE CONTROL DEVICE AND STORAGE MEDIUM

CROSS-REFERENCE TO RELATED APPLICATION

This application claims priority to Japanese Patent Application No. 2024-018695 filed on Feb. 9, 2024, incorporated herein by reference in its entirety.

BACKGROUND

1. Technical Field

The present disclosure relates to vehicle control devices and storage media that cause a vehicle to travel while maintaining a set speed and a following distance.

2. Description of Related Art

In recent years, a driver assistance technique called adaptive cruise control (ACC) has been applied to vehicles. ACC allows a vehicle to travel while maintaining a set speed and a set following distance. ACC is used on a high-standard road such as an expressway that allow vehicles to travel at high speeds. ACC is also used in a vehicle traveling at low speeds in a traffic congestion on a high-standard road. ACC may also be used in a vehicle traveling on an ordinary road.

For example, Japanese Unexamined Patent Application Publication No. 2005-75303 (JP 2005-75303 A) describes a driver assistance technique of automatically changing a set speed of a host vehicle according to the traveling speed of a vehicle traveling around the host vehicle. This driver assistance technique allows the host vehicle to travel so that the set speed of the host vehicle becomes closer to a set speed of another vehicle traveling using ACC, based on the result of comparison between first information on the set speed of the other vehicle and second information on the set speed of ACC of the host vehicle.

SUMMARY

According to the driver assistance technique described in JP 2005-75303 A, when the host vehicle is caused to travel based on ACC control, the set speed is automatically changed, but acceleration is not changed. Therefore, when the set speed of the ACC control is changed according to the driver assistance technique described in JP 2005-75303 A, the user of the host vehicle may feel uncomfortable as he or she may feel that the acceleration of the host vehicle is large or small relative to the other vehicle.

The present disclosure can provide a vehicle control device and a storage medium that can perform appropriate ACC control according to the environment in which a vehicle travels.

An aspect of the present disclosure is a vehicle control device including a control unit configured to perform cruise control for causing a vehicle to travel while maintaining a set speed.

The control unit is further configured to

- in the cruise control for maintaining the set speed, determine whether there is a traffic factor that affects the cruise control, based on a detection value for detecting surroundings of the vehicle, and
- when there is the traffic factor, adjust first acceleration set in the cruise control, according to content of the traffic factor.

According to the present disclosure, it is possible to perform appropriate ACC control according to the environment in which a vehicle travels.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a diagram illustrating a relationship between a density of a traffic participant and an adjustment gain;

FIG. 4 is a diagram illustrating a relationship between an attribute of a road environment and an adjustment gain;

FIG. 5 is a diagram illustrating a method of adjusting first acceleration based on second acceleration.

DETAILED DESCRIPTION OF EMBODIMENTS

Figure 1:
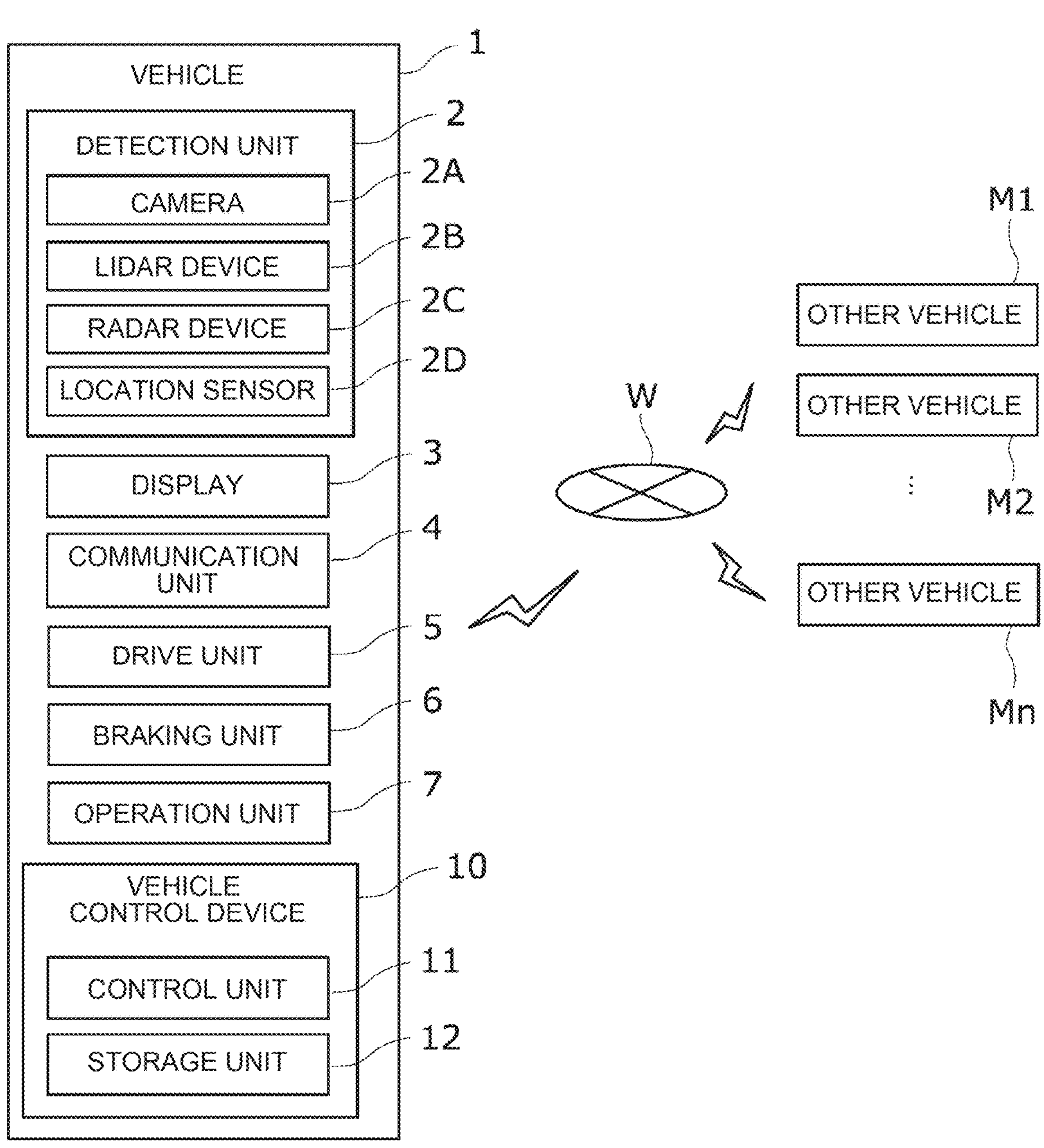
FIG. 1 is a block diagram illustrating a configuration of a vehicle control device according to an embodiment.

As illustrated in FIG. 1, the vehicle 1 is configured to be able to communicate with a plurality of other vehicles Mn (n is a natural number) via a network W. The vehicle 1 may be configured to communicate with a plurality of other vehicle Mn by inter-vehicle communication. The vehicle 1 communicates with the other vehicle Mn to transmit and receive travel-related data, and executes travel-related control in cooperation with the other vehicle Mn so as to facilitate road traffic. The vehicle 1 may acquire information on the other vehicle Mn based on information existing in the network W.

The vehicle 1 includes, for example, a vehicle control device 10 that executes control related to traveling. The vehicle control device 10 controls the traveling of the vehicle 1 based on the operation of the driver. The vehicle control device 10 executes driving support control such as ACC on the basis of the detection value detected by the detection unit 2 that detects the surroundings of the vehicle. For example, the detection unit 2 is configured to detect the surroundings of the vehicle 1 and output a detection value. The detection unit 2 includes, for example, a camera 2A that captures an image of the surroundings of the vehicle 1. The detection unit 2 may include one or more camera 2A for capturing an image of a predetermined imaging area around the vehicle 1. The camera 2A generates an image of the surroundings of the vehicle 1 and outputs the image to the vehicle control device 10.

The detection unit 2 includes a lidar device 2B that detects an object around the vehicle 1. For example, the lidar device 2B emits the laser beam within the scanning area, and receives the reflected light reflected by the laser beam from the object, thereby acquiring three-dimensional information of the object around the vehicle 1. The lidar device 2B is configured to acquire three-dimensional data of the surroundings of the vehicle 1 in the scanning area of the laser beam. The detection unit 2 includes a radar device 2C that detects an object around the vehicle 1. The radar device 2C detects an object existing around the vehicle 1 by, for example, irradiating a millimeter-wave-stagnated radar wave within a scan area and measuring a reflected wave. The radar device 2C is configured to be able to measure a distance, a velocity, and an angle to an object such as a pedestrian or a vehicle.

The detection unit 2 is provided with a position sensor 2D for measuring the present position of the vehicle 1. The position sensor 2D includes, for example, a GPS (Global Positioning System) sensor. The position sensor 2D may be used, for example, in a navigational device. The position sensor 2D outputs the measurement to the vehicle control device 10.

The vehicle 1 includes a display unit 3 that outputs a display image. The display unit 3 is constituted by a display device such as a liquid crystal display or an organic EL (Electro-Luminescence), for example. The display unit 3 displays, for example, a display image indicating the notification content when the driving support is executed. The display unit 3 may be configured to display the display contents of the navigation device provided in the vehicle 1. The display unit 3 may be constituted by a touch panel.

The display unit 3 may be configured as an input unit that receives an input operation input by a user. In this case, the display unit 3 may display a display image for receiving an input operation. The display unit 3 may be realized by communicating with a portable terminal device such as a smartphone carried by a user.

The vehicle 1 includes a communication unit 4 connectable to a network W. The communication unit 4 is constituted by, for example, a communication device capable of wireless communication. The communication unit 4 may be configured to be able to directly communicate with the other vehicle Mn. Data acquired by communication with other vehicle Mn present around the vehicle 1 is included in the detection value. Data related to other vehicles Mn present in the surroundings of the vehicle 1 obtained from the network W may be included in the detected value. The vehicle 1 includes a drive unit 5 serving as a driving source for traveling. The drive unit 5 may be constituted by an internal combustion engine or an electric motor.

The drive unit 5 may be constituted by a hybrid device in which an internal combustion engine and an electric motor are combined. When the vehicle 1 is a manual driving vehicle, the drive unit 5 is controlled based on an operation by the driver, and under a predetermined condition, the vehicle control device 10 executes driving support control for supporting the operation of the driver. When the vehicle 1 is an autonomous vehicle, the drive unit 5 is controlled by the vehicle control device 10.

The vehicle 1 includes a braking unit 6 for decelerating the vehicle 1. The braking unit 6 is constituted by, for example, a brake device. The braking unit 6 may be configured by the drive unit 5 when the drive unit 5 is configured by an electric motor. In this case, the drive unit 5 may be configured to perform regenerative power generation and decelerate based on the deceleration energy of the vehicle 1. The vehicle 1 includes an operation unit 7 that receives an operation of the driver. The operation unit 7 is constituted by an operation system device such as an accelerator pedal for adjusting an output of the drive unit 5 and a brake pedal for adjusting a braking degree of the braking unit 6. The operation unit 7 outputs, for example, a signal corresponding to the degree of operation of each operation system device to the vehicle control device 10.

The vehicle control device 10 includes a control unit 11 that executes control related to traveling of the vehicle 1, and a storage unit 12 that stores data and programs necessary for the control. The control unit 11 is constituted by a hardware processor such as at least one CPU (Central Processing Unit). The storage unit 12 includes a non-transitory storage medium such as a hard disk drive (HDD) or a solid state disk (SSD). The storage unit 12 may store map data used in the navigation device.

The storage unit 12 stores data of detection values output from the detection unit 2. The data of the detection value may be stored in a predetermined period and then updated with data of a new detection value. The control unit 11 executes cruise control such as ACC that causes the vehicle 1 to travel while maintaining the set speed, based on a detection value for detecting the surroundings of the vehicle 1. The control unit 11 switches from the normal mode to the cruise mode based on an input operation of the driver, and executes cruise control.

The control unit 11 executes cruise control based on a detection value detected by the detection unit 2, which includes, for example, imaging data captured by the camera 2A, data of a measured value of the lidar device 2B, and data of a measured value of the radar device 2C. The control unit 11 executes cruise control based on a combination of one or more detection values among detection values of any of the devices included in the detection unit 2. The combination of one or more detection values is set according to the vehicle type of the vehicle 1.

For example, in the cruise mode, the control unit 11 causes the vehicle 1 to travel in the constant speed mode in which the vehicle 1 travels at the set speed at a constant speed, or causes the vehicle 1 to travel in the following travel mode in which the vehicle 1 travels following the preceding other vehicle Mn.

Figure 2:
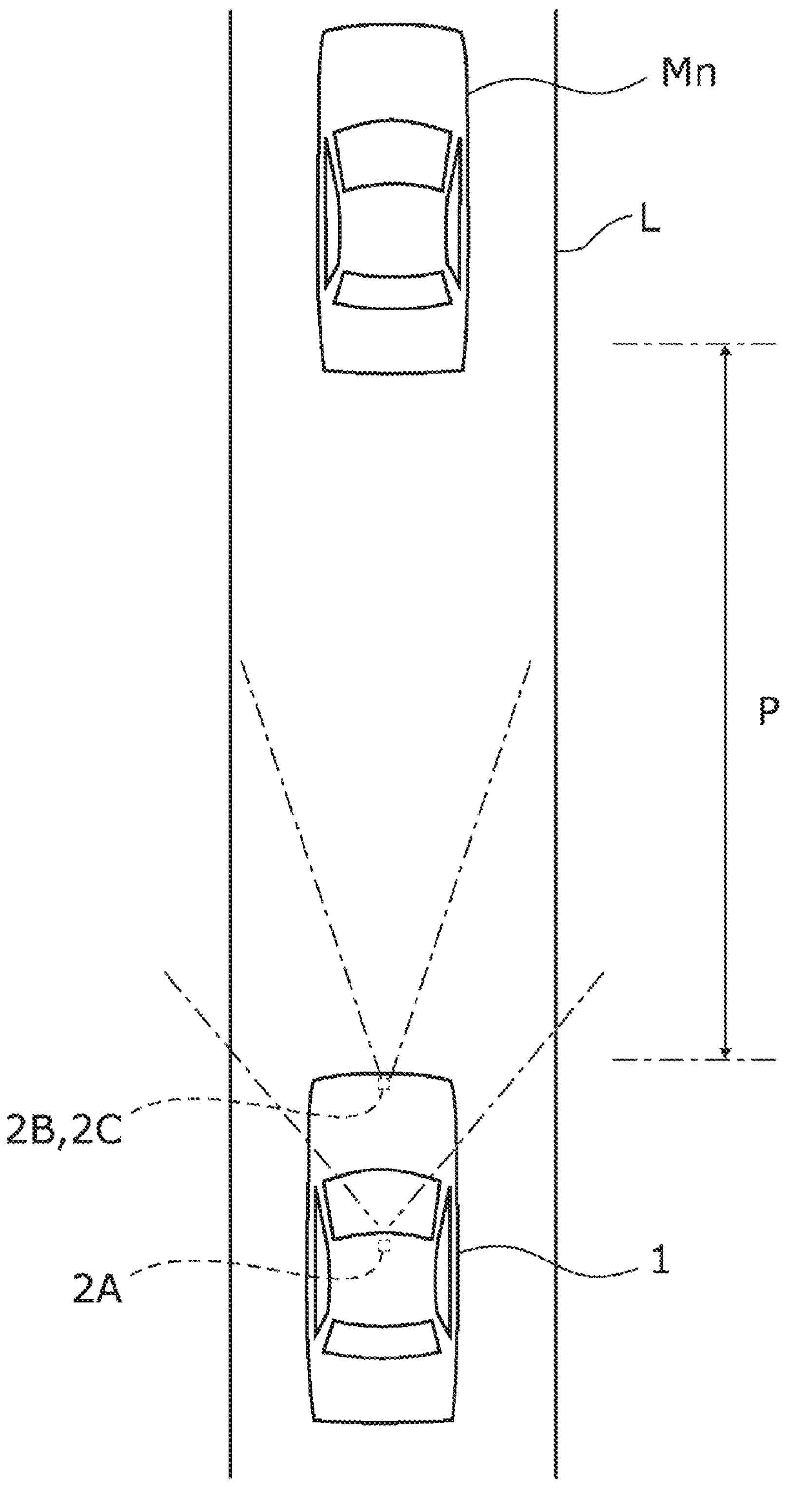
FIG. 2 schematically illustrates a method of cruise control.

As illustrated in FIG. 2, the vehicle 1 travels in the lane L by cruise control. In the illustrated example, the basic driving state of the cruise control is shown. The control unit 11, for example, determines the attribution of the road on which the vehicle 1 is traveling based on the data of the detection value of the position sensor 2D. Road attributes are classified based on different road environments, such as general roads, highways, toll roads, and high-standard roads including bypass roads. For example, the control unit 11 determines whether or not the other vehicle Mn exists in a predetermined range P ahead of the vehicle 1 in the lane L in which the vehicle 1 travels, based on the detection by the detection unit 2.

The predetermined range P is a distance adjusted according to the attribute and the speed of the road of the vehicle 1. For example, when the attribute of the road is a high-standard road, the predetermined range P is set to be longer than the distance applied to the general road. The predetermined range P is set to a predetermined distance, for example, when the attribute of the road is a general road. The predetermined range P is set to become longer as the speed of the vehicle 1 becomes higher than or equal to the threshold value, for example. For example, when the speed of the vehicle 1 is less than the threshold value, the predetermined range P is set to a predetermined constant distance. When there is no other vehicle Mn within the predetermined range P in front, the control unit 11 controls the drive unit 5 and the braking unit 6 to cause the vehicle 1 to travel so as to maintain the set speed set by the driver.

When the other vehicle Mn is present within the predetermined area P in front, the control unit 11 controls the drive unit 5 and the braking unit 6 to maintain the distance between the other vehicle Mn and the vehicle 1 at a predetermined distance or more, and also causes the vehicle 1 to travel so as to maintain the set speed set by the driver. When the speed of the other vehicle Mn traveling forward is equal to or lower than the set speed, the control unit 11 controls the drive unit 5 and the braking unit 6 to maintain the distance between the other vehicle Mn and the vehicle 1 at a predetermined distance or more, and causes the vehicle 1 to travel so as to follow the other vehicle Mn. When the speed is adjusted in the basic cruise control, the control unit 11 controls the drive unit 5 and the braking unit 6 to set a preset first acceleration to a target acceleration, accelerates the vehicle 1, and causes the speed of the vehicle 1 to reach the set speed.

When the control unit 11 executes the cruise control, the driver may feel that the first acceleration is large or small depending on the road environment in which the vehicle 1 is traveling. In the cruise control for maintaining the set speed, when there is a traffic factor that affects the cruise control, the control unit 11 may adjust the first acceleration set in the cruise control according to the content of the traffic factor. For example, in the cruise control for maintaining the set speed, the control unit 11 determines whether or not there is a traffic factor that affects the cruise control based on a detection value for detecting the surroundings of the vehicle.

Traffic factors include, for example, factors that affect cruise control. Factors affecting the cruise control include, for example, the density of the traffic participants present around the vehicle 1, the properties of the road environment in which the vehicle travels, and differences between the second acceleration and the first acceleration set in the cruise control of the other vehicle Mn present around the vehicle 1. While the cruise control of the vehicle 1 is being executed, the control unit 11 may determine that there is a traffic factor affecting the cruise control on the basis of a detection value for detecting the surroundings of the vehicle. In this case, the control unit 11 adjusts the first acceleration set in the cruise control in accordance with the content of the traffic factor.

The control unit 11 adjusts the first acceleration according to the density when the density of the traffic participant existing around the vehicle 1 among the traffic factors affects the cruise control. The control unit 11 determines, for example, the density of the traffic participants existing around the vehicle 1 among the traffic factors. The traffic participants include the other vehicle Mn present in the lane L. For example, the control unit 11 communicates with the other vehicle Mn to acquire the number of the other vehicle Mn that are around the vehicle 1 and that are traveling in the lane L, and calculates the density of the vehicle traveling in the lane L.

The control unit 11 may extract the traffic participants in the surroundings of the vehicle 1 and calculate the traffic participants' densities based on the analysis of the captured images captured by the camera 2A. For example, the control unit 11 may be configured to be able to extract traffic participants such as other vehicles Mn and pedestrians included in the captured data by executing machine learning such as deep learning using teacher data in advance. The control unit 11 calculates the density of the traffic participants in the lane L based on the extracted number of the traffic participants. The control unit 11 may extract not only other vehicle Mn but also traffic participants such as pedestrians and light vehicles.

The control unit 11 may estimate the density of the traffic participants on the lane L on which the vehicle 1 is traveling by not only calculating the density of the traffic participants present on the lane L on which the vehicle 1 is traveling but also calculating the density of the traffic participants present on the lane adjacent to the lane L. For example, the control unit 11 adjusts the first acceleration so as to decrease as the density of the traffic participants increases.

As illustrated in FIG. 3, the control unit 11 calculates an adjustment gain $\Omega$ ($0 \leq \Omega \leq 1$) for adjusting the first acceleration based on the density $\rho$ of the traffic participant. The adjustment gain $\Omega$ is set so as to decrease as the density $\rho$ of the traffic participant increases, and is set so as to be a lower limit value when the density $\rho$ of the traffic participant exceeds a certain value. The control unit 11 calculates the adjusted target acceleration $\alpha'1$ by multiplying the first acceleration $\alpha1$ by the adjustment gain $\Omega$ based on the following Expression (1).

$$\alpha'1=\alpha1\times\Omega \tag{1}$$

The control unit 11 executes cruise control based on the target acceleration obtained by adjusting the first acceleration. The above-described setting value of the adjustment gain $\Omega$ and the calculation method of the target acceleration $\alpha'1$ are examples, and other calculation methods may be used as long as the first acceleration can be adjusted in accordance with the density $\rho$ of the traffic participant.

As illustrated in FIG. 4, the control unit 11 may adjust the first acceleration according to the content of the attribute of the road environment in which the vehicle travels among the traffic factors. For example, the control unit 11 determines whether the vehicle 1 is traveling in the lane L based on the detected position sensor 2D. The control unit 11 classifies the attribute (road attribute) of the road environment correlated with the magnitude of the density of the traffic participants. For example, the control unit 11 classifies the road environment into preset attributes such as high-standard roads, rural roads, quasi-urban areas, and residential districts in order of the density of the traffic participants. The control unit 11 calculates the adjusted target acceleration $\alpha'1$ by multiplying the first acceleration by an adjustment gain $\Omega$ set in advance according to, for example, the content of the attribute of the road environment.

For example, on a high-standard road, the control unit 11 multiplies the first acceleration by an adjustment gain $\Omega$ that is higher than that of the residential street to calculate the adjusted target acceleration $\alpha'1$. In addition to the above-described attributes of the road environment, the control unit 11 may determine the number of lanes adjacent to the lane L and adjust the first acceleration. For example, the control unit 11 may multiply the first acceleration by an adjustment gain $\Omega$ that is larger as the number of lanes adjacent to the lane L increases, and may adjust the first acceleration by multiplying the first acceleration by an adjustment gain $\Omega$ that is smaller as the number of lanes adjacent to the lane L decreases.

For example, the control unit 11 may determine the lane width of the lane L and adjust the first acceleration. The control unit 11 may multiply the first acceleration by an adjustment gain $\Omega$ that is larger as the lane width of the lane L increases, and may adjust the first acceleration by multiplying the first acceleration by an adjustment gain $\Omega$ that is smaller as the lane width of the lane L decreases.

For example, the control unit 11 may determine the road curvature of the lane L and adjust the first acceleration. The control unit 11 may multiply the first acceleration by an adjustment gain $\Omega$ that is larger as the road curvature of the lane L increases, and may adjust the first acceleration by multiplying the first acceleration by an adjustment gain $\Omega$ that is smaller as the road curvature of the lane L decreases.

For example, the control unit 11 may determine the road gradient of the lane L and adjust the first acceleration. The control unit 11 may multiply the first acceleration by an adjustment gain $\Omega$ that is larger as the road slope of the lane L becomes an upward slope, and multiply the first acceleration by an adjustment gain Ω that is smaller as the road slope of the lane L of the lane L becomes a downward slope, thereby adjusting the first acceleration.

For example, the control unit 11 may determine the signal density of the lane L and adjust the first acceleration. The control unit 11 may multiply the first acceleration by an adjustment gain Ω that is larger as the signal density of the lane L increases, and may adjust the first acceleration by multiplying the first acceleration by an adjustment gain Ω that is smaller as the signal density of the lane L decreases.

The control unit 11 may adjust the first acceleration $\alpha 1$ according to the traveling condition of the other vehicle Mn among the traffic factors. The control unit 11 calculates the second acceleration $\alpha 2$ in the traveling condition of the other vehicle Mn existing around the vehicle 1 based on the detection value detected by the detection unit 2. The control unit 11 compares the calculated second acceleration $\alpha 2$ and the first acceleration $\alpha 1$ of the other vehicle Mn.

As illustrated in FIG. 5, when the calculated difference between the second acceleration $\alpha 2$ and the first acceleration $\alpha 1$ of the other vehicle Mn exceeds a preset reference, the control unit 11 adjusts the first acceleration $\alpha 1$ in accordance with the second acceleration $\alpha 2$. For example, the control unit 11 compares the absolute value of the difference value between the second acceleration $\alpha 2$ and the first acceleration $\alpha 1$ with the reference value Q, and adjusts the first acceleration $\alpha 1$ so as to set the second acceleration $\alpha 2$ as the target acceleration when the difference value exceeds the reference value Q. The reference is set based on a difference, a ratio, and the like between the second acceleration $\alpha 2$ and the first acceleration $\alpha 1$. The control unit 11 executes cruise control of the vehicle 1 based on the adjusted first acceleration $\alpha 1$.

Figure 6:
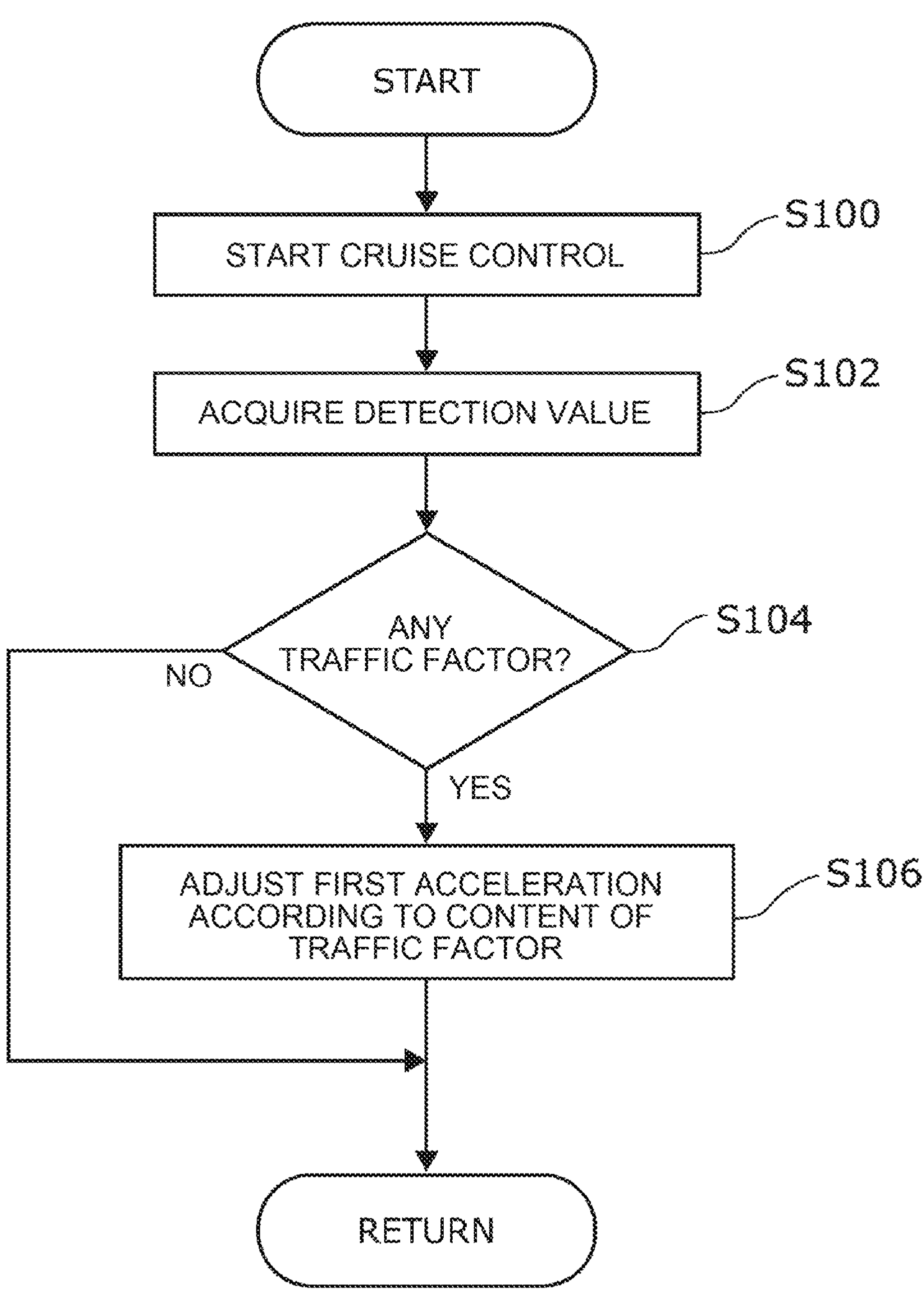
FIG. 6 is a flowchart illustrating a flow of processing of the vehicle control method executed in the vehicle control device.

FIG. 6 shows a flow of processing of the vehicle control method based on the cruise control executed by the vehicle control device 10. The vehicle control method is executed based on a computer program installed in a computer installed in the vehicle control device 10. The vehicle control device 10 executes the following processes.

The control unit 11 starts cruise control for maintaining the set speed based on an input operation of the driver (S100). The control unit 11 acquires a detection value detected by the detection unit 2 (S102). The control unit 11 determines whether or not there is a traffic factor affecting the cruise control based on a detection value for detecting the surroundings of the vehicle 1 (S104). When it is determined that there is a traffic factor affecting the cruise control around the vehicle 1, the control unit 11 adjusts the first acceleration according to the content of the traffic factor (S106).

As described above, according to the vehicle control device 10, it is possible to execute appropriate ACC control in accordance with the content of the traffic factor affecting the cruise control around the vehicle 1. According to the vehicle control device 10, by adjusting the first acceleration according to the content of the traffic factor affecting the cruise control around the vehicle 1, it is possible to reduce the uncomfortable feeling that the driver feels at the first acceleration. According to the vehicle control device 10, by adjusting the first acceleration in accordance with the density of the traffic participants present around the vehicle 1, the speed of the vehicle 1 can be adjusted in accordance with the traffic flow of the other vehicle Mn present around the vehicle 1.

According to the vehicle control device 10, by adjusting the first acceleration according to the attribute of the road environment around the vehicle 1, it is possible to adjust the speed of the vehicle 1 in accordance with the road environment around the vehicle 1. According to the vehicle control device 10, by adjusting the first acceleration in accordance with the second acceleration of the other vehicle Mn existing around the vehicle 1, it is possible to adjust the velocity of the vehicle 1 in accordance with the traffic flow of the other vehicle Mn.

In the above-described embodiment, the computer program executed in each configuration of the vehicle control device 10 may be provided in a form recorded on a computer-readable portable non-transitory recording medium. The computer-readable portable non-transitory recording medium is, for example, a semiconductor memory, a magnetic recording medium, or an optical recording medium.

What is claimed is:

1. A vehicle control device that controls a host vehicle to perform a cruise control that causes the host vehicle to maintain travel at a set speed, the vehicle control device comprising:

a processor configured to acquire a detection value output from a sensor installed on the host vehicle, the sensor being configured to detect surroundings of the host vehicle; and determine whether traffic factor that affects the cruise control is present based on the acquired detection value while the cruise control is performed, wherein the processor adjusts a first acceleration that is set in the cruise control in response to determining that the traffic factor affects the cruise control, and the traffic factor includes one or more of a lane width, a road curvature, or a road gradient associated with a road environment in which the vehicle is travelling.

2. The vehicle control device according to claim 1, wherein the processor is further configured to adjust the first acceleration according to the density when the traffic factor indicates a density of traffic present around the host vehicle affects the cruise control.

3. The vehicle control device according to claim 1, wherein the processor is further configured to adjust the first acceleration using a second acceleration as target acceleration when the traffic factor indicates a difference between the second acceleration and the first acceleration exceeds a reference value, the second acceleration being an acceleration of a second vehicle around the host vehicle while the second vehicle is traveling.

4. The vehicle control device according to claim 1, wherein the processor is further configured to calculate an acceleration adjustment value based on the one or more properties of the lane width, the road curvature, or the road gradient associated with a road environment; and multiplies the first acceleration by the acceleration adjustment value to calculate an adjusted first acceleration to be set in the cruise control.

5. The vehicle control device according to claim 4, wherein the processor is further configured to increase the acceleration adjustment value as the lane width increases and reduce the acceleration adjustment value as the lane width decreases.

6. The vehicle control device according to claim 4, wherein the processor is further configured to increase the acceleration adjustment value as the road curvature increases and reduce the acceleration adjustment value as the road curvature decreases.

7. The vehicle control device according to claim 4, wherein the processor is further configured to increase the acceleration adjustment value as the road gradient increases and reduce the acceleration adjustment value as the road gradient decreases.

8. A non-transitory computer-readable storage medium storing program instructions that cause a vehicle control device to control a host vehicle to perform a cruise control that causes the host vehicle to maintain travel at a set speed, the cruise control comprising:

acquiring a detection value output from a sensor installed on the vehicle, the sensor being configured to detect surroundings of the vehicle; and determining whether a traffic factor that affects the cruise control is present based on the acquired detection value while the cruise control is performed, wherein the program instructions cause vehicle control device to adjust a first acceleration that is set in the cruise control in response to a determination that the traffic factor affects the cruise control, and the traffic factor includes one or more of a lane width, a road curvature, or a road gradient associated with a road environment in which the vehicle is travelling.

* * * * *